United States Patent [19]

De Rees

[11] Patent Number: 4,716,682
[45] Date of Patent: Jan. 5, 1988

[54] MODULAR DOOR STRUCTURE

[75] Inventor: Delbert D. De Rees, Romeo, Mich.

[73] Assignee: American Motors Corporation, Southfield, Mich.

[21] Appl. No.: 893,791

[22] Filed: Aug. 6, 1986

[51] Int. Cl.⁴ .............................................. E05K 11/44
[52] U.S. Cl. ..................................... 49/352; 49/374; 49/502
[58] Field of Search ............... 49/352, 374, 376, 502, 49/475; 292/147, 148

[56] References Cited

U.S. PATENT DOCUMENTS

| | | |
|---|---|---|
| 1,251,433 | 12/1917 | Smith . |
| 1,251,990 | 1/1918 | Maise ................................ 49/374 |
| 1,409,962 | 3/1922 | Maise . |
| 1,541,960 | 6/1925 | Hull . |
| 1,556,638 | 10/1925 | Seeley . |
| 1,557,256 | 3/1926 | Hull . |
| 1,711,010 | 4/1929 | Beringer . |
| 2,922,473 | 1/1960 | LeBron . |
| 3,028,157 | 4/1962 | Batley ................................ 49/352 |
| 3,703,053 | 11/1972 | De Rees ............................ 49/475 |

FOREIGN PATENT DOCUMENTS

1951710 4/1971 Fed. Rep. of Germany ........ 49/352

Primary Examiner—Kenneth J. Dorner
Assistant Examiner—Gerald A. Anderson
Attorney, Agent, or Firm—Brooks & Kushman

[57] ABSTRACT

A modular door comprises a lower door housing defining a cavity adapted to receive a glass panel, and an upper cassette including a housing carrying a track for displaceably mounting the glass panel with respect to the upper housing and a regulator for controlling displacement of the glass panel along the track. The cassette is removable as a unit from the lower door housing to expose the passenger compartment through a large portion of the door opening in the vehicle body. The lower housing is hingedly secured to the vehicle body within the door opening and wholly supports the upper housing of the cassette. Nevertheless, the door unit seals against a weatherseal extending around the periphery of the door opening when the glass panel is displaced to its fully extended position.

22 Claims, 9 Drawing Figures

MODULAR DOOR STRUCTURE

BACKGROUND OF THE INVENTION

I. Field of the Present Invention

The present invention relates generally to vehicle closure panels, and more particularly to a door panel having upper and lower housing portions which are detachable from each other and wherein the upper housing portion carries a retractable window panel.

II. Description of the Prior Art

Doors for motor vehicles are often made as a unitary structure for enclosing the entire door opening of a motor vehicle body. The lower housing portion of the door structure carries a window regulating mechanism which displaces a window panel to and between a raised position at which the window panel covers the upper portion of the door opening, and a retracted position in which the window panel is recessed within a cavity in the lower housing portion. The lower housing portion is generally formed from an outer panel and an inner panel which define the cavity therebetween adapted to receive the window panel. The lower housing structure also includes door closure actuating means such as a latch mechanism and means for hingedly securing the door within the door opening of the vehicle body.

It can be appreciated that such a unitary structure has a substantial amount of weight. Thus, even when the window glass is retracted so that air flow through the passenger compartment can be provided as desired, a substantial amount of stress and wear in the hinge structure which supports the door occurs during opening and closing of the door structure. Moreover, the weight of the vehicle is not easily reduced by removal of the window panel or its operating mechanism even if the use of the window panel is not desired under certain operating conditions.

It has also been known to construct a vehicle door from separate upper and lower portions. In particular, early car models often included a door panel hingedly secured to the vehicle body and covering only a lower portion of the side opening of a vehicle. The top of the opening was then covered by a separate panel or other window housing separately secured to the vehicle body. In addition, it has been known to hingedly or slideably secure the upper panel or housing to the lower door structure, but such constructions often permitted only limited displacement of the upper panel or positioned it in an exposed or unprotected area when not in use. For example, some previously known upper panels merely overlap the lower door structure or an adjacent body panel of the vehicle, and can obstruct the area within the vehicle passenger compartment.

Furthermore, although it has been known to include removable upper window panels and removable housings for receiving such panels, the removable housings do not include any mechanism for raising or lowering the window. Rather, operating mechanisms have typically been constructed within the lower door structure, and cannot be easily removed from the door structure. Furthermore, such mechanisms support the bottom of the glass panel within the lower housing and render removal of the glass panel itself difficult.

U.S. Pat. No. 1,556,638 discloses an upper window frame which slideably receives a glass panel and can be mounted to a lower door housing. However, the upper frame does not support a window regulator mechanism which can be removed along with the frame.

SUMMARY OF THE PRESENT INVENTION

The present invention overcomes the above-mentioned disadvantages by providing a modular door construction having a lower door housing and an upper, operable window module unit referred to hereinafter as a removable cassette. The cassette comprises a housing which carries a glass panel, a means for displaceably mounting the glass panel to the housing so that the panel can be moved between a raised position at which it covers the upper portion of the door opening in the vehicle and a retracted position at which it is received in a cavity in the lower door housing, and a regulating mechanism for controlling displacement of the glass panel. These components are removable as a unit from the lower door housing in order to minimize the weight of the door structure when a completely enclosed passenger compartment is not desired. Nevertheless, even when the upper housing portion is installed on the lower door housing, the passenger compartment can be selectively exposed by retracting the window panel into the lower door housing in a protected position.

A lower edge of the upper housing is adapted to mate with the top of the lower housing and a simple means such as toggle clamps or other fasteners can be used to couple the upper and lower housings. The toggle clamp of the preferred embodiment permits easy removal of the upper housing from the lower housing while providing a secure and stable connection between the upper and lower housings while the door is opened and closed.

Preferably, the cassette includes a glass panel having a shape corresponding to the portion of the door opening to be closed by the panel, so as to become peripherally sealed against the vehicle body. The guide means carried by the upper housing for displaceably supporting the glass panel includes a track which extends through and below the upper housing and can be received within the lower housing. The upper portion of the track can be enclosed within a raised pillar portion of the upper housing, but it is mounted so that the alignment of the track can be adjusted. The cassette also includes a means for regulating displacement of the glass panel to and between its raised and retracted positions. In the preferred embodiment, a particularly compact regulating means comprises a cable, cog belt or other flexible elongated member whose displacement drives the glass panel along the track.

In addition, the guide means of the preferred embodiment further includes a track follower and means for securing the track follower to the glass panel. The track can be conveniently provided by a longitudinal channel secured to the upper housing and adapted to receive a pair of rollers rotatably mounted to the glass panel at vertically spaced apart positions on the glass panel. These positions may also serve as anchoring points for the ends of a belt, which is positively engaged with a crank mechanism or other means for longitudinally displacing the belt.

Preferably, a guide means for directing the ends of the belt in corresponding movement along the track comprises rollers mounted on a support plate for the crank mechanism. The upper and lower anchoring points remain above and below, respectively, the position of the rollers regardless of the actual position of the glass panel relative to its raised and retracted positions.

The track has a length substantially longer than the height of the pillar portion of the housing so that the other end of the track extends below the bottom of the upper housing. The lower end of the track can be retained in a fixed position with respect to the lower housing by a retaining means adjustably secured within the lower housing.

In view of the foregoing, it will be understood that removal of the upper cassette will result in removal of the glass panel as well as the guide means for displaceably supporting the panel and the regulator mechanism which controls the position of the glass panel. Moreover, the cassette or upper housing unit is easily removed from the lower housing and stored when not in use. Moreover, it will be appreciated that removal of the cassette substantially reduces the weight of the door structure remaining on the vehicle. Furthermore, it can be appreciated that the window can still be retracted into a protected position even when the cassette is mounted on the lower door housing when temporary exposure of the passenger compartment is desired. These and other advantages of the present invention will be discussed in greater detail in the following detailed description.

BRIEF DESCRIPTION OF THE DRAWING

The present invention will be more clearly understood by reference to the following detailed description of a preferred embodiment when read in conjunction with the accompanying drawing in which like reference characters refer to like parts throughout the views and in which.

DETAILED DESCRIPTION OF A PREFERRED EMBODIMENT OF THE PRESENT INVENTION

Figure 1:
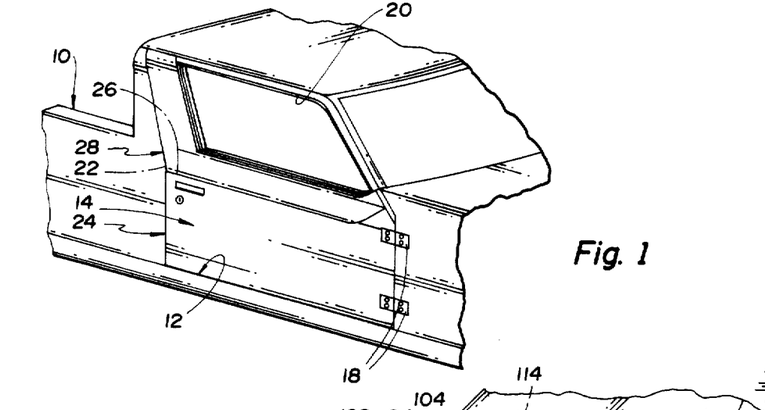
FIG. 1 is a perspective view of a portion of a vehicle body including a modular door constructed in accordance with the present invention.

Referring first to FIG. 1, a vehicle body 10 is thereshown including a door opening 12 enclosed by a modular door 14 constructed in accordance with the present invention. The modular door 14 is hingedly secured to the body 10 by a pair of hinges 18 to be discussed in greater detail hereinafter. The periphery of the door opening 12 includes a weatherseal element 20 which provides a weathertight seal between the door 14 and the body 10 at the periphery of the door opening 12. The door opening 12 can be considered to have a first portion 22 generally designated by phantom line at 22, which is generally covered by a lower housing portion 24, and a second portion generally designated at 26 extending directly above the first door opening portion 22. The door 16 includes an upper unit or cassette 28 adapted to cover at least a portion of the upper or second portion 26 of the door opening 12 as well be described in greater detail hereinafter.

Figure 3:
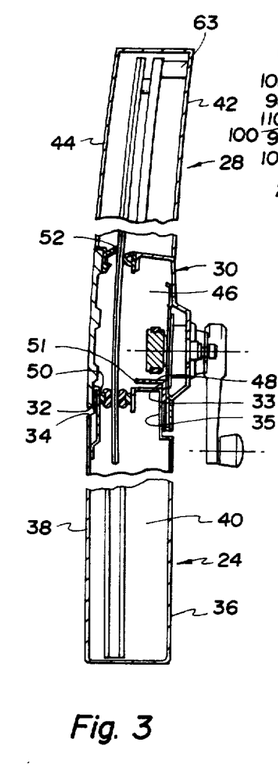
FIG. 3 is an enlarged sectional view taken substantially along the line 3—3 in FIG. 2.
Figure 4:
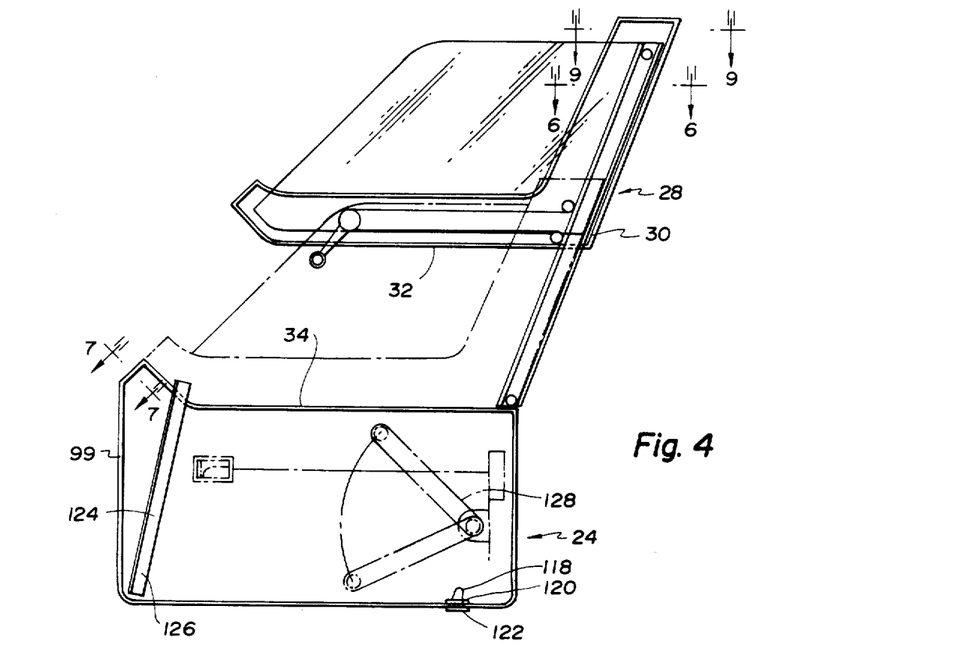
FIG. 4 is an exploded side view of the modular door shown in FIG. 1 through 3.

Referring now to FIG. 4, the cassette 28 includes a housing 30 which is separable from the lower door housing 24. The housing 30 includes a lower edge 32 adapted to rest upon the top edge 34 of the lower housing portion 24. As best shown in FIG. 3, the bottom edge 32 and the top edge 34 can be particularly configured for interlocking and mating engagement of the upper housing 30 with the lower housing 24 to provide stable support for the cassette 28 mounted on the lower door housing 24. Thus, as shown in FIG. 3, a hollow channel 33 formed in the lower edge 32 of the housing 30 is adapted to slideably receive a raised central portion 35 of the lower housing 24.

With further reference to FIG. 3, the lower housing 24 can be formed from an interior panel 36 and an exterior panel 38 in the manner of known door constructions to define therebetween a cavity 40. Similarly, the upper housing 30 can be formed from an interior panel 42 configured to combine with the exterior panel 44 to form a cavity 46. In the preferred embodiment, these panels are made of a structural plastic although metal or other relatively rigid materials can be used. Although the general idea of forming door housings from exterior and interior panels is well known, the upper housing 30 includes a lower edge reinforcement panel 48 which terminates short of the exterior panel 44 to form an opening 51 which communicates with an opening 50 in the lower housing 24 to provide communication between the cavity 46 in the upper housing 30 and the cavity 40 in the lower housing 24. The upper housing 30 also includes an upper opening 52, and these openings will be described in greater detail hereinafter.

Figure 5:
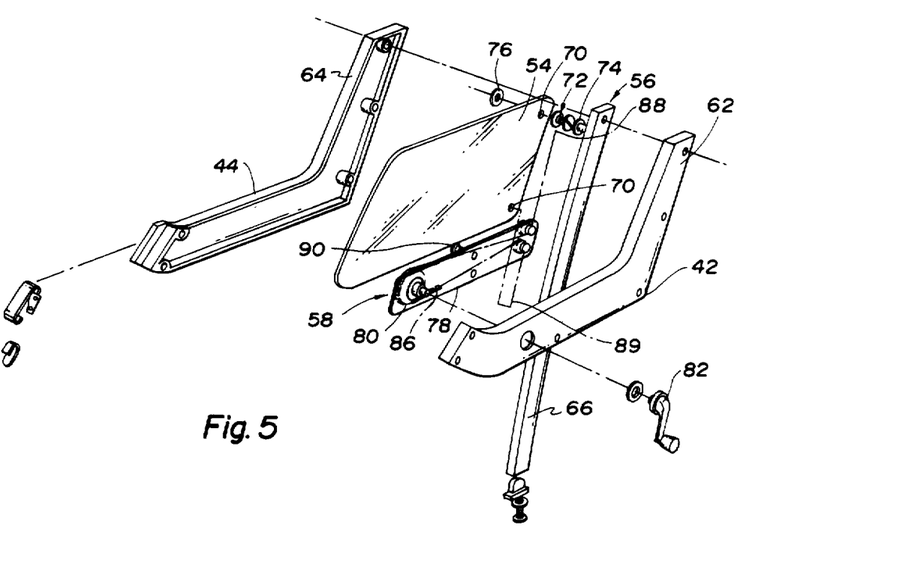
FIG. 5 is an exploded perspective view of the cassette module shown in FIGS. 1 through 4.

The construction of the cassette 28 is more clearly shown in FIG. 5. The interior panel 42 and the exterior panel 44 form the housing 30 which supports a guidance means generally designated at 56 for displaceably supporting a glass panel 54. Displacement of the panel 54 is controlled by a regulator mechanism generally designated at 58. In the preferred embodiment, each housing portion 42 and 44 includes mating pillar portions 62 and 64 respectively. The pillar portions define an extended pillar portion 65 at the rear of the housing 30 which encloses a cavity 46 adapted to receive a track 66 of the guide means 56.

The track 66 is conveniently formed by an elongated channel member having a length longer than the height of the pillar portion 65 of the housing. An end of the track 66 is retained within the pillar portion 65 by appropriate means such as the pivot bolt 68 which is pivotally received within an aperture in the channel member forming the track 66 and secured within an appropriate mounting boss in the pillar portion 62 of the interior panel 42. The pivot bolt 68 permits angular adjustment of the track 66 within the pillar portion 65 as will be discussed in greater detail hereinafter.

Figure 9:
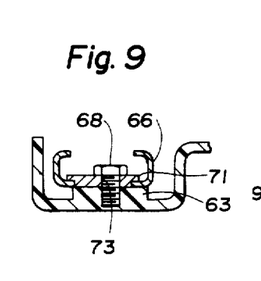
FIG. 9 is an enlarged sectional view taken substantially along the line 7—7 in FIG. 4.

Moreover, the means for retaining the track 66 in pillar portion 65 is adjustable to permit alignment of the glass panel. For example, as best shown in FIG. 9, a bushing 71 having an eccentric bore 73 extends through the aperture in the channel member forming track 66. The pivot bolt 68 extends through the eccentric bore 73 and as the bushing 71 is rotated within the aperture in the channel member about pivot bolt 68, the track 66 is displaced with respect to the pillar portion 65. However, the end of the track 66 is retained in a relatively fixed alignment when the pivot bolt 68 is tightened into the boss.

Figure 6:
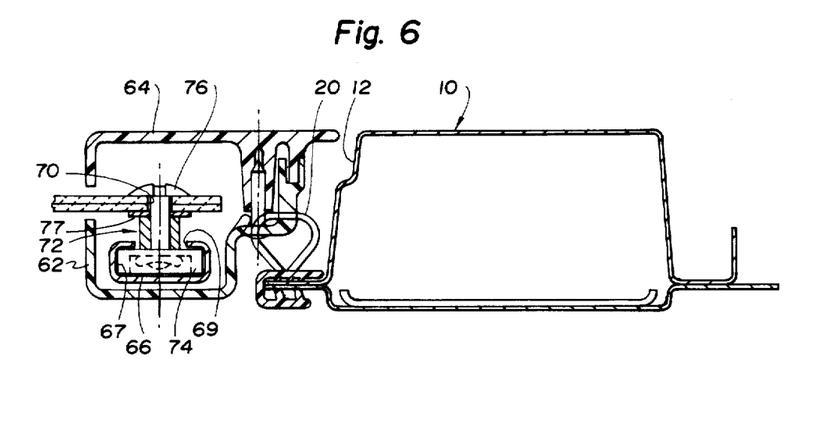
FIG. 6 is an enlarged sectional view taken substantially along the line 6—6 in FIG. 4 but showing additional environmental structure.

The glass panel 54 includes vertically spaced apertures 70 adapted to receive studs 72 including rotatably mounted rollers 74. Each stud 72 is retained in position by a spanner nut 76 threadedly engaged with the stud and entraining the panel 59 between the nut 76 and shoulder 77. The roller 74 is appropriately sized for sliding engagement within the channel 67 (FIG. 6) of the track 66. As best shown in FIG. 6, the roller 74 is entrained within the channel 67 by a restricted opening 69 appropriately sized to permit the stud 72 to slide along the track 66.

As also shown in FIG. 5, the regulator mechanism 58 of the preferred embodiment includes a plate 78 having a sprocket 80 rotatably mounted at one end. The sprocket is rotatably driven by appropriate means such as the handle assembly diagrammatically indicated at 82 which protrudes through an opening in the interior panel 42 so as to be accessible within the passenger compartment of the vehicle. Of course, it is to be understood that alternative means such as an electric drive motor can also be used to rotatably drive the sprocket 80. The sprocket 80 engages a belt, cable or other flexible member so that rotation of sprocket 80 longitudinally displaces the flexible member. In the preferred embodiment, the sprocket includes circumferentially spaced teeth which can be received in spaced perforations of a belt 86.

The other end of the plate 78 includes a guide means for directing the ends of the belt in corresponding movement along the track. The guide means can be conveniently provided by a pair of spaced guide rollers 84. The belt 86 extends around the sprocket 80 while an upper portion is wrapped beneath the top roller 84 so that a first end 88 of the belt 86 can be fixedly secured with respect to the glass panel 54 near its top. Preferably, the end 88 of the belt 86 is secured about the upper stud 72. The lower portion of the belt 86 is wrapped about the lowermost roller 84 so that the other end 90 is positioned to be secured in a fixed position with respect to a lower portion of the glass panel 54, preferably at the lowermost stud 72. The plate 78 is fixedly secured to housing 30 by appropriate means such as the bolts 90 which lock the plate to appropriate bosses within the housing panel 42.

Thus, as is best described with reference to FIG. 4, as the sprocket 80 is rotated about its axis, for example, counterclockwise in FIG. 4, the glass panel 54 is displaced from a raised position as the upper portion of the belt 86 shortens and the lower portion correspondingly lengthens. Conversely, rotation in the opposite direction, clockwise in FIG. 4, displaces the panel 54 to a raised position as the lower portion of the belt 86 is shortened and the upper portion is correspondingly lengthened. Nevertheless, it is to be understood that other regulating mechanisms can be employed in the cassette without departing from the scope of the present invention.

Figure 7:
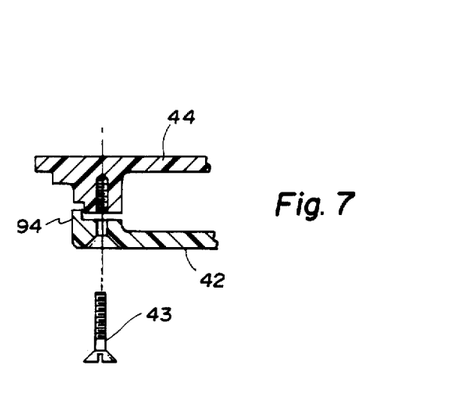
FIG. 7 is an enlarged sectional view taken substantially along the line 7—7 in FIG. 4.

As best shown in FIG. 7, the front edge of the interior panel 42 and the exterior panel 44 include mating bosses which can be secured together by installation of a threaded fastener 43. A substantially similar arrangement can be made at the rear of each panel with mating bosses in the pillar portions 62 and 64, respectively.

Nevertheless, it is to be understood that FIG. 7 represents a typical section of the preferred manner for connecting the panels and is not to be considered a limitation of the exact position of the mating bosses. Moreover, other means for securing the panels 42 and 44 can be used so long as the panels 42 and 44 can be secured together without obstructing the openings 52 and 51 at the top and bottom, respectively, of the housing 30.

Figure 2:
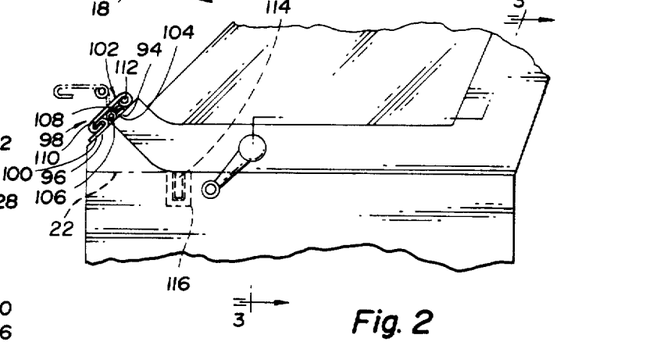
FIG. 2 is a side plan view of the door panel shown in FIG. 1.

Moreover, the panels 42 and 44 form a leading edge 94 which is aligned with a leading edge portion 96 of the lower housing 24. Moreover, the enlarged front portion 99 has a height greater than the height of the first portion of the door opening 22 to be closed by the lower door so that the mating engagement between the top edge 34 and the bottom edge 32 occurs at at least three non-linear points to stabilize and resist rotation of said upper housing about the top edge 34. As best shown in FIG. 2, the front edge 94 of the housing 30 and the front edge 96 of the housing 24 can be provided with appropriate means for coupling the upper housing 30 to the lower housing 24 such as a toggle clamp 98. In the preferred embodiment, a hook member 100 is secured to the face of the edge 96 while a toggle mechanism 102 is mounted to the face of front edge 94. The toggle mechanism 102 includes a plate 104 supporting a pivot pin 106 in a fixed position so that a lever arm 108 is pivotally mounted at one end about the pin 106. The lever arm 108 is pivoted at its other end to toggle arm 110 by a pivot pin 112. The toggle arm 110 also includes a hook at the opposite end adapted to interengage with the hook 100 on the housing portion 124. The hooks are interengaged while the toggle mechanism 98 is in the position shown in phantom line in FIG. 2, and the housings 30 and 24 are locked together as the toggle mechanism 102 is displaced to the position shown in solid line in FIG. 2.

While such a mechanism provides secure coupling between the upper housing and the lower housing, the housing 30 is easily detached from the housing 106 by lifting the pivoted end of the toggle arm 110 to the position shown in phantom line in FIG. 2 and disengaging the hook on the toggle arm from the hook 100. To assure that the upper housing 30 is properly aligned with the lower housing 24, additional means such as alignment pins 114 (one shown) extending from the housing 30 and receivable in correspondingly positioned sockets 116 in the lower housing 24, can be mounted to the respective housing portion. Nevertheless, it will be understood that other forms of alignment means can be utilized without departing from the scope of the present invention. Moreover, it is to be understood that FIG. 2 represents a typical means for coupling the housings 24 and 30 without limitation as to the placement or number of these preferred toggle connections. Aligned surfaces on the housings 30 and 24 adapted to support toggle clamps 98 can be provided on the sides or rear of the housings as well, and other means can be used to securely mount the upper housings 30 with the lower housing 30 in accordance with the invention.

Referring again to FIG. 4, a means for adjusting the alignment of the track 66 permits unobstructed displacement of the glass panel 54 between its raised and retracted positions and assures tight sealing engagement between the panel 54 and the weatherseal element 20 when the panel 54 is in its raised position. In the preferred embodiment, an adjustment pin 118 is clamped in a fixed position within an expanded aperture 120 in the bottom of the lower housing 24. As the clamping nut 122 is loosened, the adjustment pin 118 can be displaced within the opening 120 so that the pin 118, having a head which is adapted to be received in an end of the track 66, positions the end of the track 66 for properly aligned displacement of the glass panel 54. Since the upper end of the track 66 is pivotally secured with respect to the pillar portion 65, the alignment can be easily adjusted when the housing 30 has been mounted and coupled to the lower housing 24. Furthermore, the bushing 71 permits additional adjustment of the path and limit positions of the glass panel 54.

The lower housing 24 can also includes a channel member 124 which forms a means for guiding the front edge of the glass panel 54 as it descends into the cavity 40 in the lower housing 24. The channel member 124 serves to restrict lateral movement of the glass panel 54 within the lower housing, and can be provided with a soft resilient liner 126 which prevents rattling of the forward end of the glass panel within the channel member during operation of the vehicle.

If desired, a resiliently biased counterbalance arm 128 can be mounted in the lower housing 24 to counteract the weight of the glass panel 54 and permit easy displacement of the glass panel 54 during operation of the regulating means 58. A wide variety of counterbalancing mechanisms are currently available, and can be employed as desired without departing from the scope and spirit of the present invention.

While the lower door housing 24 can be specially constructed in the manner specified in the preferred embodiment, it may be appreciated that the upper housing can be easily formed to mate with known door housings. In either case, the latch mechanism for retaining the door in its closed position is mounted in the lower door housing in a preferred construction.

Figure 8:
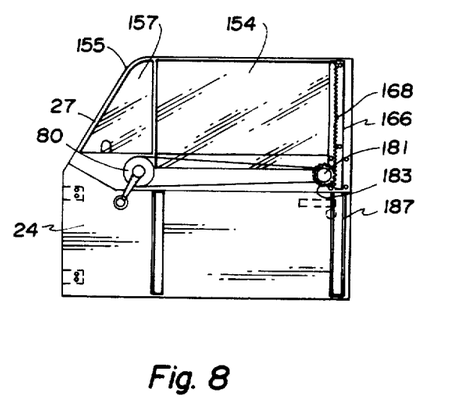
FIG. 8 is a sectional view showing a modification of a modular door constructed in accordance with the present invention.

Referring now to FIG. 8, several modifications of the modular door construction within the scope of the present invention are disclosed. In particular, it can be seen that the portion of the door opening 12 that is covered by the glass panel 154 is only a portion of the upper portion 26 of the door opening formed in the vehicle body 10. A third portion 27 of the door opening is covered by a quarter window framing structure 155 supporting a pivotally mounted pane 157 in the upper forward portion of the door opening. Such quarter window structures are well known and need not be discussed in greater detail although it is to be understood that such a frame structure 155 can be rigidly supported by the housing 30 for tight engagement against the weatherseal element 20 at the periphery of the door opening 12.

In addition, FIG. 8 discloses a modified regulator mechanism 158 in which an endless belt 186 is engaged with a sprocket 80 and a sprocket 181 which is also rotatably supported on a regulator plate 178. The sprocket 181 is secured to a pinion gear 183 for rotation therewith. The track 166 includes a rack 168 whose teeth are positioned for a direct engagement with the teeth on the pinion gear 183. The track 166 can be aligned for sliding displacement by support rollers 185 rotatably secured within the housing 30. Preferably, the rollers 185 are adjustably mounted to the plate 178 so that the alignment of the track is adjustable. The track 166 is fixedly secured at one end to the glass panel and directly displaces the pane 154 between its raised and retracted positions. Additional guides for displacement of the track 166 can be provided in the lower housing as shown at 187 in FIG. 8. In any event, it will understood that many modifications can be incorporated in a modular door constructed in accordance with the present invention without departing from the scope of the present invention.

Although any hinge means for mounting a door to a vehicle body can be employed with the door construction of the present invention, the door in the preferred embodiment utilizes external hinge brackets 18 for hingedly mounting the door within the door opening 12 of the vehicle body 10. In the preferred embodiment, the lower door housing 24 has an enlarged front portion 99 which is vertically expanded to provide additional spacing between the hinges 18. Such additional spacing between the hinges provides substantially greater strength to the cantilever support for the modular door and enables the cassette 28 to be wholly supported by the lower housing 24.

Having thus described important structural features of the invention as applied in the preferred embodiment, it will be understood that the present invention provides a modular door construction in which an upper cassette carries a glass panel, means for displaceably mounting the glass panel and means for controlling displacement of the glass panel which can be mounted and removed from the lower door housing as a complete unit. As a result, the entire window and operating mechanism is easily removed from the door when exposure of the passenger compartment is desired. Nevertheless, even when the cassette is mounted to the lower door housing, the window can be displaced between a raised position at which the panel 54 is fully extended through the upper opening 52 of the upper housing 30 whereby it is positioned to cover the upper portion of the door opening, and a retracted position at which the glass is retracted from the upper portion of the door opening and extends downwardly through the openings 51 and 50 into the lower housing 24.

Moreover, although the glass panel could also be housed within a frame, the peripheral contour of the pane preferably corresponds with the peripheral outline of a portion of the door opening so that it tightly seals against the vehicle body 10 at the weatherseal element 20 in its raised position without additional support. Furthermore, regardless of the position of the glass panel, the upper housing remains stably and fixedly secured to the lower door housing. In addition, it will be appreciated that removal of the cassette substantially reduces the suspended weight of the vehicle and removes protrusions from the passenger compartment such as the handle assembly which may be used to regulate displacement of the window when the module is installed.

Having thus described the present invention, many modifications thereto will become apparent to those skilled in the art to which it pertains without departing from the scope and spirit of the present invention as defined in the appended claims.

What is claimed is:

1. A vehicle door for closure of a vehicle door opening comprising:
    a lower housing defining an open-topped cavity and having a peripheral outline substantially corresponding to the shape of a first portion of the door opening along the sides and bottom of the door opening, and having a top edge;

an upper housing having a lower edge adapted to matingly engage the top edge of said lower housing;

a glass panel;

guide means carried by said upper housing for displaceably supporting said glass panel with respect to said upper housing at and between a raised position in which said glass panel encloses a second portion of said door opening above said first portion of the door opening, and a lowered position retracted from said second portion of said door opening at which at least a portion of said panel extends into said cavity;

means for regulating displacement of said glass panel to and between said raised and lowered positions, said regulating means being wholly carried by said upper housing; and means for coupling said upper housing to said lower housing.

2. The invention as defined in claim 1 wherein said guide means comprises a track mounted to said upper housing, a track follower and means for securing said track follower to said glass panel.

3. The invention as defined in claim 2 wherein said track comprises an elongated member having a longitudinal channel, wherein said track follower comprises at least one roller and wherein said means for securing comprises means for rotatably mounting said roller to said glass panel.

4. The invention as defined in claim 2 wherein said upper housing includes a pillar portion and wherein said track is mounted in said pillar portion.

5. The invention as defined in claim 4 wherein said track has a length greater than the height of said pillar portion, and further comprising means for securing an end of said track in said pillar portion, whereby at least a portion of said track extends downwardly below said lower edge of said upper housing.

6. The invention as defined in claim 5 and further comprising guide means carried by said lower housing for retaining said track in a fixed position within said lower housing.

7. The invention as defined in claim 6 wherein said means for securing said track in said pillar portion includes means for selectively adjusting the alignment of said track, and wherein said means for retaining includes means for selectively adjusting said fixed position.

8. The invention as defined in claim 7 wherein said means for securing said track in said pillar portion includes means for pivotally securing said track with respect to said pillar portion.

9. The invention as defined in claim 1 wherein said lower housing includes at least one hinge for pivotally securing said lower housing in said vehicle door opening, and including latch means for selectively securing said lower housing in a closed position in said vehicle door opening, and wherein said upper housing is wholly supported by said lower housing for unitary movement therewith.

10. The invention as defined in claim 9 wherein said at least one hinge comprises two hinges fixed at spaced apart positions along said leading edge portions.

11. The invention as defined in claim 1 wherein said means for coupling includes means for detachably coupling said upper housing to said lower housing so that said upper housing is selectively removable from said lower housing.

12. The invention as defined in claim 11 wherein said means for coupling includes at least one toggle clamp.

13. The invention as defined in claim 2 wherein said means for regulating comprises:

a belt having first and second ends fixedly secured with respect to said glass panel at vertically spaced first and second positions of said glass panel;

a sprocket;

means for rotatably mounting said sprocket in said housing at a fixed position in direct engagement with a portion of said belt intermediate said first and second ends; and means for selectively rotating and sprocket.

14. The invention as defined in claim 13 wherein said means for regulating further comprises guide means for directing displacement of said first and second ends in corresponding movement along said track.

15. The invention as defined in claim 1 wherein said glass panel has a peripheral outline substantially corresponding to the shape of an upper portion of the door opening above said first portion.

16. In combination with a door panel having an open-topped cavity adapted to receive a glass panel, the improvement comprising:

a housing defining a hollow channel extending through a top of said housing and a bottom of said housing correspondingly dimensioned to receive the glass panel therethrough;

a glass panel;

means for slideably supporting said glass panel with respect to said housing so that said glass panel is displaceable to and from an extended position at which said panel protrudes from the top of said housing and a retracted position at which said panel is substantially positioned below the top of said housing;

means carried wholly by said housing for regulating displacement of said panel to and between said first and second positions; and means for mounting said housing atop the door panel with said glass panel in registration with the open-topped cavity.

17. A vehicle door for closure of a vehicle door opening comprising:

a lower housing defining an open-topped cavity and having a peripheral outline substantially corresponding to the shape of a first portion of the door opening along the sides and bottom of the door opening, and having a top edge;

an upper housing having a lower edge adapted to magtingly engage the to edge of said lower housing;

a glass panel;

guide means carried by said upper housing for displaceably supporting said glass panel with respect to said upper housing at and between a raised position in which said glass panel encloses a second portion of said door opening above said first portion of the door opening, and a lowered position retracted from said second portion of said door opening at which at least a portion of said panel extends into said cavity;

means for regulating displacement of said glass panel to and between said raised and lowered positions;

means for coupling said upper housing to said lower housing;

wherein said guide means comprises a track mounted to said upper housing, a track follower and means for securing said track follower to said glass panel;

wherein said upper housng includes a pillar portion and wherein said track is mounted in said pillar portion;

wherein said track has a length greater than the height of said pillar portion, and further comprising means for securing an end of said track in said pillar portion, whereby at least a portion of said track extends downwardly below said lower edge of said upper housing; and wherein said means for securing said track in said pillar portion includes means for selectively adjusting the alignment of said track, and wherein said means for retaining includes means for selectively adjusting said fixed position.

18. The invention as defined in claim 17 wherein said means for securing said track in said pillar portion includes means for pivotally securing said track with respect to said pillar portion.

19. A vehicle door for closure of a vehicle door opening comprising:

a lower housing defining an open-topped cavity and having a peripheral outline substantially corresponding to the shape of a first portion of the door opening along the sides and bottom of the door opening, and having a top edge;

an upper housing having a lower edge adapted to matingly engage the top edge of said lower housing;

a glass panel;

guide means carried by said upper housing for displaceably supporting said glass panel with respect to said upper housing at and between a raised position in which said glass panel encloses a second portion of said door opening above said first portion of the door opening, and a lowered position retracted from said second portion of said door opening at which at least a portion of said panel extends into said cavity;

means for regulating displacement of said glass panel to and between said raised and lowered positions;

means for coupling said upper housing to said lower housing;

wherein said lower housing portion includes a leading edge portion having a height greater than the height of said first portion of said door opening; and whereby mating engagement between said top edge and said bottom edge occur at least three non-linear points to stabilize and resist rotation of said upper housing about said top edge of said lower housing.

20. The invention as defined in claim 19 wherein said means for coupling includes means for detachably coupling said upper housing to said lower housing so that said upper housing is selectively removable from said lower housing.

21. The invention as defined in claim 20 wherein said means for coupling includes at least one toggle clamp.

22. A vehicle door for closure of a vehicle door opening comprising:

a lower housing defining an open-topped cavity and having a peripheral outline substantially corresponding to the shape of a first portion of the door opening along the sides and bottom of the door opening, and having a top edge;

an upper housing having a lower edge adapted to matingly engage the top edge of said lower housing;

a glass panel;

guide means carried by said upper housing for displaceably supporting said glass panel with respect to said upper housing at and between a raised position in which said glass panel encloses a second portion of said door opening above said first portion of the door opening, and a lowered position retracted from said second portion of said door opening at which at least a portion of said panel extends into said cavity;

means for regulating displacement of said glass panel to and between said raised and lowered positions;

means for coupling said upper housing to said lower housing; and wherein one of said upper and lower edges defines a hollow channel, and wherein the other of said edges includes a raised portion slidably receiveable in said hollow channel whereby said upper housing nests on said lower housing.

* * * * *

UNITED STATES PATENT AND TRADEMARK OFFICE
CERTIFICATE OF CORRECTION

PATENT NO. : 4,716,682

DATED : January 5, 1988

INVENTOR(S) : Delbert D. DeRees

It is certified that error appears in the above-identified patent and that said Letters Patent is hereby corrected as shown below:

| | |
|---|---|
| Column 4, Line 5, | "well" should be --will--; |
| Column 10, Line 13, Claim 13, | After "rotating" delete "and" and insert --said--; |
| | "sproket" should be --sprocket--; |
| Column 10, Line 52, Claim 17, | "magtingly" should be --matingly--; "to" should be --top--; |
| Column 12, Line 6, Claim 19, | Delete "occur" and insert --occurs at--. |

Signed and Sealed this

Twenty-eighth Day of June, 1988

*Attest:*

DONALD J. QUIGG

*Attesting Officer*   *Commissioner of Patents and Trademarks*